US008802239B2

(12) United States Patent
Kojima et al.

(10) Patent No.: US 8,802,239 B2
(45) Date of Patent: Aug. 12, 2014

(54) TREATMENT COMPOSITION FOR WIPE PAPER

(75) Inventors: Kazuhiko Kojima, Ichihara (JP); Masaru Ozaki, Ichihara (JP)

(73) Assignee: Dow Corning Toray Co., Ltd., Chiyoda-Ku (JP)

( * ) Notice: Subject to any disclaimer, the term of this patent is extended or adjusted under 35 U.S.C. 154(b) by 0 days.

(21) Appl. No.: 13/501,868

(22) PCT Filed: Oct. 14, 2010

(86) PCT No.: PCT/JP2010/068045
§ 371 (c)(1),
(2), (4) Date: Jun. 22, 2012

(87) PCT Pub. No.: WO2011/046168
PCT Pub. Date: Apr. 21, 2011

(65) Prior Publication Data
US 2012/0251833 A1    Oct. 4, 2012

(30) Foreign Application Priority Data

Oct. 16, 2009    (JP) ................................ 2009-239113

(51) Int. Cl.
*C07F 7/18*    (2006.01)
*B32B 29/00*    (2006.01)
*C09D 7/12*    (2006.01)

(52) U.S. Cl.
USPC ..................................... 428/447; 106/287.11

(58) Field of Classification Search
None
See application file for complete search history.

(56) References Cited

U.S. PATENT DOCUMENTS

| | | | |
|---|---|---|---|
| 4,620,878 A * | 11/1986 | Gee ................................ | 516/55 |
| 5,082,590 A | 1/1992 | Araud | |
| 5,164,046 A * | 11/1992 | Ampulski et al. ............ | 162/111 |
| 5,573,637 A | 11/1996 | Ampulski et al. | |
| 5,965,649 A * | 10/1999 | Kondo et al. ................. | 524/320 |
| 6,086,663 A * | 7/2000 | Kondo et al. ............ | 106/287.11 |
| 6,528,121 B2 * | 3/2003 | Ona et al. ...................... | 427/387 |
| 6,964,725 B2 * | 11/2005 | Shannon et al. .............. | 162/127 |
| 7,588,662 B2 | 9/2009 | Lang et al. | |
| 7,998,495 B2 | 8/2011 | Argo et al. | |
| 2010/0132126 A1 * | 6/2010 | Itou et al. .......................... | 8/137 |

FOREIGN PATENT DOCUMENTS

| | | |
|---|---|---|
| AU | 613765 B2 | 8/1991 |
| CL | 37320 | 11/1988 |
| CL | 1950-95 | 12/1995 |
| CL | 625-04 | 4/2004 |
| CL | 698-08 | 3/2008 |
| CN | 1964625 A | 5/2007 |
| JP | 02-224626 A | 9/1990 |
| JP | 03-000900 A | 1/1991 |
| JP | 06-311943 A | 11/1994 |
| JP | 07-145596 A | 6/1995 |
| JP | 11-043898 A | 2/1999 |
| JP | 2006-169690 A | 6/2006 |
| WO | WO 2004/084864 A1 | 10/2004 |

OTHER PUBLICATIONS

English language abstract for JP 02-224626 extracted from the espacenet.com database on Jun. 27, 2012, 14 pages.
English language abstract for JP 03-000900 extracted from the espacenet.com database on Jun. 27, 2012, 17 pages.
English language abstract and machine-assisted translation for JP 06-311943 extracted from the PAJ database on Jun. 27, 2012, 43 pages.
English language abstract and machine-assisted translation for JP 07-145596 extracted from the PAJ database on Jun. 27, 2012, 50 pages.
English language abstract and machine-assisted translation for JP 11-043898 extracted from the PAJ database on Jun. 28, 2012, 44 pages.
English language abstract and machine-assisted translation for JP 2006-169690 extracted from the PAJ database on Jun. 27, 2012, 16 pages.
International Search Report for Application No. PCT/JP2010/068045 dated Jan. 11, 2011, 3 pages.
English language abstract for CN 1964625 extracted from the espacenet.com database on Feb. 20, 2014, 34 pages.
English language abstract not available for CL 37320; however, see English language equivalent US 5,082,590. Original document, 17 pages.
English language abstract not available for CL 625-04; however, see English language equivalent WO 2004/084864. Original document, 19 pages.
English language abstract not available for CL 698-08; however, see English language equivalent US 7,588,662. Original document, 45 pages.
English language abstract not available for CL 1950-95; however, see English language equivalent US 5,573,637. Original document, 83 pages.

* cited by examiner

*Primary Examiner* — Robert S Loewe
(74) *Attorney, Agent, or Firm* — Howard & Howard Attorneys PLLC

(57) ABSTRACT

The present invention relates to a composition for use in treating paper, comprising a specific amide polyether group-containing polyorganosiloxane. The present invention can impart superior texture in view of softness, smoothness and the like to wipe paper such as tissue paper, toilet paper or the like, wherein the color of the wipe paper does not change, and water absorbability is not inhibited.

16 Claims, No Drawings

TREATMENT COMPOSITION FOR WIPE PAPER

RELATED APPLICATIONS

This application claims priority to and all the advantages of International Patent Application No. PCT/JP2010/068045, filed on Oct. 14, 2010, which claims priority to Japanese Patent Application No. JP 2009-239113, filed on Oct. 16, 2009.

TECHNICAL FIELD

The present invention relates to a composition for use in treating wipe paper.

Priority is claimed on Japanese Patent Application No. 2009-239113, filed on Oct. 16, 2009, the content of which is incorporated herein by reference.

BACKGROUND ART

Various treatments have been carried out heretofore in order to improve the softness and smoothness of wipe paper represented by tissue paper or toilet paper.

For example, Japanese Unexamined Patent Application, First Publication No. H03-900, and Japanese Unexamined Patent Application, First Publication No. H02-224626 describe soft tissue papers which are subjected to surface treatment with various types of polyorganosiloxanes. In addition, Japanese Unexamined Patent Application, First Publication No. H07-145596 proposes a method for treating the surface of wipe paper with a polyorganosiloxane and a polyhydric alcohol. However, the aforementioned wipe papers still have room for improvement in view of softness and roughness.

On the other hand, Japanese Unexamined Patent Application, First Publication No. H06-311943 discloses a method for treating wipe paper with an aqueous dispersion of an amino group-containing polyorganosiloxane and a polyether group-containing polyorganosiloxane. In addition, Japanese Unexamined Patent Application, First Publication No. 2006-169690 proposes a method for treating wipe paper with an amino group-containing polyorganosiloxane, glycerol and sorbitol. However, the aforementioned methods still have room for improvement in view of yellowing and/or water absorbability, although softness can be improved.

PRIOR ART DOCUMENT

Patent Document

Patent Document 1: Japanese Published Unexamined Patent Application No. H03-900
Patent Document 2: Japanese Published Unexamined Patent Application No. H02-224626
Patent Document 3: Japanese Published Unexamined Patent Application No. H07-145596
Patent Document 4: Japanese Published Unexamined Patent Application No. H06-311943
Patent Document 5: Japanese Published Unexamined Patent Application No. 2006-169690

DISCLOSURE OF THE INVENTION

Technical Problems

An object of the present invention is to provide a composition for use in treating wipe paper which can impart superior texture in view of softness, smoothness and the like to wipe paper such as tissue paper, toilet paper or the like, wherein the color of the wipe paper does not change, and water absorbability is not inhibited.

Technical Solution

The object of the present invention can be achieved by a treatment composition for wipe paper comprising an amide polyether group-containing polyorganosiloxane represented by the following general formula:

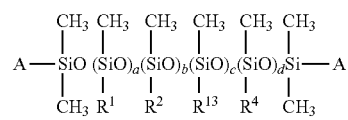

wherein
each A is independently an alkyl group having 1 to 22 carbon atoms or a hydroxyl group;
$R^1$ is an alkyl group having 1 to 22 carbon atoms;
$R^2$ is a group represented by the following formula:

wherein $R^5$ is a divalent hydrocarbon group having 1 to 22 carbon atoms; each of $R^6$ and $R^7$ is independently a hydrogen atom or an organic group selected from the group consisting of a monovalent hydrocarbon group having 1 to 22 carbon atoms, an acyl group, and a group represented by the following formula:

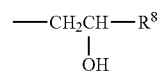

wherein $R^8$ is a monovalent hydrocarbon group having 1 to 22 carbon atoms; and e is an integer ranging from 0 to 5;
$R^3$ is a group represented by $-R^9-O-(C_2H_4O)_f(C_lH_{2l}O)_g-R^{10}$ wherein $R^9$ is a divalent hydrocarbon group having 1 to 22 carbon atoms; $R^{10}$ is a hydrogen atom or a monovalent hydrocarbon group having 1 to 22 carbon atoms; both f and g range from 0 to 50, with the proviso that f and g are not 0 at the same time; and l is an integer of 3 or more;
$R^4$ is a group represented by the following formula:

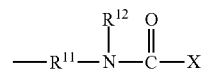

or a group represented by the following formula:

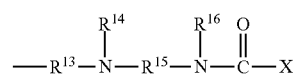

wherein each of $R^{11}$, $R^{13}$ and $R^{15}$ is independently a divalent hydrocarbon group having 1 to 22 carbon atoms; each of $R^{12}$, $R^{14}$ and $R^{16}$ is independently a hydrogen atom or a monovalent hydrocarbon group having 1 to 22 carbon atoms; X is a group represented by the following formula:

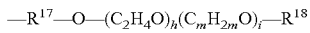

wherein $R^{17}$ is a divalent hydrocarbon group having 1 to 22 carbon atoms; $R^{18}$ is a hydrogen atom or a monovalent hydrocarbon group having 1 to 22 carbon atoms; both h and i range from 0 to 50, with the proviso that h and i are not 0 at the same time; and m is an integer of 3 or more;
each of a, b and c independently ranges from 0 to 500; $1 \leq d \leq 500$; and $10 \leq a+b+c+d \leq 1,000$.

The treatment composition for wipe paper of the present invention preferably contains
(A) the aforementioned amide polyether group-containing polyorganosiloxane, and
(B) an oxyalkylene group-containing polyorganosiloxane binding to a silicon atom, represented by the following formula: $-R^{19}O-(C_2H_4)_j(C_nH_{2n}O)_k-R^{20}$ wherein $R^{19}$ is a divalent hydrocarbon group having 1 to 22 carbon atoms; $R^{20}$ is a hydrogen atom or a monovalent hydrocarbon group having 1 to 22 carbon atoms; both j and k range from 0 to 50, with the proviso that j and k are not 0 at the same time; and n is an integer of 3 or more.

The treatment composition for wipe paper of the present invention preferably further contains (C) a surfactant.

In the treatment composition for wipe paper of the present invention, the aforementioned component (A) and the aforementioned component (B) can be present in a ratio of 5 to 2,000 parts by weight of the aforementioned component (B) with respect to 100 parts by weight of the aforementioned component (A).

The treatment composition for wipe paper of the present invention preferably further contains (D) a polyhydric alcohol.

The aforementioned component (D) can be present in a ratio of 50 to 20,000 parts by weight with respect to 100 parts by weight of the aforementioned component (A).

The aforementioned component (D) can be at least one selected from the group consisting of glycerol, diglycerol, polyglycerol and sorbitol.

The treatment composition for wipe paper of the present invention preferably further contains (E) water.

The treatment composition for wipe paper of the present invention may be in the form of an emulsion.

The present invention also relates to wipe paper treated with the aforementioned treatment composition for wipe paper.

Advantageous Effects

When the treatment composition for wipe paper of the present invention is used as a treatment agent for wipe paper such as tissue paper, toilet paper or the like, wiping properties and water absorbability of the aforementioned wipe paper are not impaired, color of the aforementioned wipe paper does not change, and at the same time, texture such as softness, smoothness or the like of the aforementioned wipe paper can be improved.

In addition, in the case of the treatment composition for wipe paper of the present invention in the form of an emulsion, a particle size of a dispersion phase containing the amide polyether group-containing polyorganosiloxane is small, and for this reason, superior storage stability is also exhibited.

BEST MODES FOR CARRYING OUT THE INVENTION

The treatment composition for wipe paper of the present invention comprises an amide polyether group-containing polyorganosiloxane. The amide polyether group-containing polyorganosiloxane used in the present invention can provide smoothness and softness to wipe paper such as tissue paper, toilet paper or the like by means of the siloxane chain of the main chain, and in addition, it can adsorb on the wipe paper without reducing water absorbability by means of the amide polyether group, thus providing the wipe paper with smoothness, softness and moisture-retaining properties. The amide polyether group-containing polyorganosiloxane is represented by the following general formula:

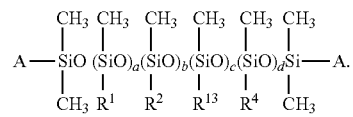

In the aforementioned general formula,
each A is independently an alkyl group having 1 to 22 carbon atoms, preferably an alkyl group having 1 to 6, and more preferably an alkyl group having 1 to 3 carbon atoms, or a hydroxyl group;
$R^1$ is an alkyl group having 1 to 22 carbon atoms, preferably an alkyl group having 1 to 6, and more preferably an alkyl group having 1 to 3 carbon atoms;
$R^2$ is a group represented by the following formula:

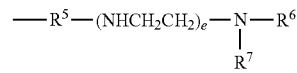

wherein $R^5$ is a divalent hydrocarbon group having 1 to 22 carbon atoms; each of $R^6$ and $R^7$ is independently a hydrogen atom or an organic group selected from the group consisting of a monovalent hydrocarbon group having 1 to 22 carbon atoms, an acyl group, and a group represented by the following formula:

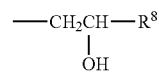

wherein $R^8$ is a monovalent hydrocarbon group having 1 to 22 carbon atoms; and e is an integer ranging from 0 to 5, is preferably 0 or 1, and is more preferably 0;
$R^3$ is a group represented by $-R^9-O-(C_2H_4O)_f(C_1H_{21}O)_g-R^{10}$ wherein $R^9$ is a divalent hydrocarbon group having 1 to 22 carbon atoms; $R^{10}$ is a hydrogen atom or a monovalent hydrocarbon group having 1 to 22 carbon atoms, and preferably having 1 to 6 carbon atoms; both f and g range from 0 to 50, with the proviso that f and g are not 0 at the same time; and l is an integer of 3 or more, is preferably an integer ranging from 3 to 6, and is more preferably 3 or 4;
$R^4$ is a group represented by the following formula:

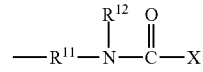

or a group represented by the following formula:

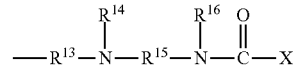

wherein each of $R^{11}$, $R^{13}$ and $R^{15}$ is independently a divalent hydrocarbon group having 1 to 22 carbon atoms; each of $R^{12}$, $R^{14}$ and $R^{16}$ is independently a hydrogen atom or a monovalent hydrocarbon group having 1 to 22 carbon atoms; X is a group represented by the following formula:

$$-R^{17}-O-(C_2H_4O)_h(C_mH_{2m}O)_i-R^{18}$$

wherein $R^{17}$ is a divalent hydrocarbon group having 1 to 22 carbon atoms; $R^{18}$ is a hydrogen atom or a monovalent hydrocarbon group having 1 to 22 carbon atoms and preferably having 1 to 6 carbon atoms; both h and i range from 0 to 50, with the proviso that h and i are not 0 at the same time; and m is an integer of 3 or more, is preferably an integer ranging from 3 to 6, and is more preferably 3 or 4;
each of a, b and c independently ranges from 0 to 500; $1 \leq d \leq 500$; and $10 \leq a+b+c+d \leq 1,000$.

The values of a, b, c and d are not particularly limited as long as they are within the aforementioned range. In view of water absorbability, $b \leq c+d$ is preferred. In view of yellowing, $0 \leq b/(a+b+c+d) \leq 0.1$ is preferred. In addition, preferably, each of b, c, and d is independently 1 or more.

f, g, h and i are not particularly limited as long as they are within the aforementioned range. In view of water absorbability, $g \leq f$ and $i \leq h$ are preferred, $1 \leq f+g \leq 30$ and $1 \leq h+i \leq 30$ are preferred, and in particular, $1 \leq f+g \leq 20$ and $1 \leq h+i \leq 20$ are preferred.

In the aforementioned formula, the oxyethylene unit ($C_2H_4O$) and the oxyalkylene unit represented by $C_1H_{21}O$ or $C_mH_{2m}O$ may be block-copolymerized or random-copolymerized.

As examples of divalent hydrocarbon groups, mention may be made of, for example, linear or branched alkylene groups having 1 to 22 carbon atoms such as a methylene group, a dimethylene group, a trimethylene group, a tetramethylene group, a pentamethylene group, a hexamethylene group, a heptamethylene group, an octamethylene group and the like; arylene groups having 6 to 22 carbon atoms such as a phenylene group, diphenylene group and the like; alkylarylene groups having 7 to 22 carbon atoms such as a dimethylene phenylene group and the like; and substituted groups of the aforementioned groups in which hydrogen atoms bound to the carbon atoms of the aforementioned groups are at least partially substituted with a halogen atom such as fluoride or the like or an organic group containing a carbinol group, an epoxy group, a glycidyl group, an acyl group, an carboxyl group, an amino group, a methacryl group, a mercapto group, an amide group, an oxyalkylene group or the like. The divalent hydrocarbon group is preferably a non-substituted divalent hydrocarbon group having 1 to 22 carbon atoms, is preferably a linear or branched alkylene group having 1 to 22 carbon atoms, and a methylene group, a dimethylene group or a trimethylene group is, in particular, preferred.

As examples of monovalent hydrocarbon groups, mention may be made of, for example, linear or branched alkyl groups having 1 to 22 carbon atoms such as a methyl group, an ethyl group, a propyl group, a butyl group, a pentyl group, a hexyl group, a heptyl group, an octyl group, a decyl group, a dodecyl group and the like; cycloalkyl groups having 3 to 10 carbon atoms such as a cyclopentyl group, a cyclohexyl group and the like; alkenyl groups having 2 to 10 carbon atoms such as a vinyl group, an allyl group, a butenyl group, a hexenyl group, an octenyl group and the like; aryl groups having 6 to 22 carbon atoms such as a phenyl group, a tolyl group, a xylyl group, a naphthyl group and the like; aralkyl groups having 7 to 22 carbon atoms such as a benzyl group, a phenethyl group and the like; and substituted groups of the aforementioned groups in which hydrogen atoms bound to the carbon atoms of the aforementioned groups are at least partially substituted with a halogen atom such as fluoride or the like or an organic group containing a carbinol group, an epoxy group, a glycidyl group, an acyl group, an carboxyl group, an amino group, a methacryl group, a mercapto group, an amide group, an oxyalkylene group or the like. The monovalent hydrocarbon group is preferably a non-substituted monovalent hydrocarbon group having 1 to 22 carbon atoms, and more preferably a non-substituted monovalent hydrocarbon group having 1 to 6 carbon atoms, and a methyl group, an ethyl group, or a phenyl group is, in particular, preferred.

The viscosity of the amide polyether group-containing polyorganosiloxane at 25° C. is not particularly limited, but is preferably 50 mPa·s or more, and more preferably ranges from 100 to 10,000 mPa·s. If the viscosity thereof at 25° C. is below 50 mPa·s, smoothness and softness may not be sufficiently imparted to wipe paper such as tissue paper, toilet paper or the like.

The amide polyether group-containing polyorganosiloxane used in the present invention can be obtained, for example, by amidating a part or all of the amino groups of an amino group-containing polyorganosiloxane or a polyorganosiloxane containing amino and polyether groups, using a polyoxyethylene alkyl ether fatty acid.

The treatment composition for wipe paper of the present invention can contain, in addition to the aforementioned amide polyether group-containing polyorganosiloxane, for example, various solvents or media such as alcohol and the like. As the alcohol, a lower alcohol having 1 to 6 carbon atoms is preferred and ethanol is, in particular, preferred. In this case, the treatment composition for wipe paper of the present invention is preferably in the form of a solution.

In the treatment composition for wipe paper of the present invention, an oxyalkylene group-containing polyorganosiloxane can also be blended. Smoothness and softness can be imparted to wipe paper, and good storage stability of an emulsion and good blending stability with respect to a polyhydric alcohol described below are exhibited. For these reasons, it is preferable to combine the oxyalkylene group-containing polyorganosiloxane with the aforementioned amide polyether group-containing polyorganosiloxane.

The oxyalkylene group-containing polyorganosiloxane used in the present invention is an organopolysiloxane containing an organic group represented by the following formula:

$$-R^{19}-O-(C_2H_4O)_j(C_nH_{2n}O)_k-R^{20}$$

wherein $R^{19}$ is a divalent hydrocarbon group having 1 to 22 carbon atoms; $R^{20}$ is a hydrogen atom or a monovalent hydrocarbon group having 1 to 22 carbon atoms; both j and k range from 0 to 50, with the proviso that j and k are not 0 at the same time, $1 \leq j$ is preferred; and n is an integer of 3 or more. As the group other than the aforementioned organic group binding to the silicon atom of the oxyalkylene group-containing polyorganosiloxane, a hydrocarbon having 1 to 6 carbon atoms is preferred, an alkyl group having 1 to 6 carbon atoms is more preferred, and a methyl group is further preferred. The oxyalkylene group-containing polyorganosiloxane may contain a small amount of an alkoxy group or a hydroxyl group. The viscosity of the oxyalkylene group-containing polyorganosiloxane at 25° C. preferably ranges from 5 to 2,000 mPa·s, more preferably ranges from 10 to 1,000 mPa·s, and further preferably ranges from 100 to 1,000 mPa·s.

In the aforementioned formula, the oxyethylene unit ($C_2H_4O$) and the oxyalkylene unit represented by $C_nH_{2n}O$ may be block-copolymerized or random-copolymerized. In addition, the binding of the organic group represented by the aforementioned formula may be carried out at any position of the side chain, both ends, or one end. The value of n is not particularly limited as long as n is an integer of 3 or more. In view of water absorbability, n is preferably an integer ranging from 3 to 5. j and k are not particularly limited as long as they are within the aforementioned range. In view of water absorbability, $1 \leq j+k \leq 30$ is preferred. In particular, $k \leq j$ and $1 \leq j+k \leq 20$ are preferred. The amount of the oxyalkylene group, preferably the oxyethylene group, and namely $(C_2H_4O)_j$ $(C_nH_{2n}O)_k$ in the aforementioned formula and preferably the unit represented by $(C_2H_4O)$ in the aforementioned component is 15% by weight or more, and preferably ranges from 30 to 70% by weight. If the amount is below 15% by weight, the water-solubility of this component may be reduced, and the water absorbability of wipe paper treated with the composition according to the present invention may reduced.

The blending amount of the oxyalkylene group-containing polyorganosiloxane preferably ranges from 5 to 2,000 parts by weight, more preferably ranges from 20 to 1,000 parts by weight, further preferably ranges from 50 to 500 parts by weight, and most preferably ranges from 100 to 500 parts by weight, with respect to 100 parts by weight of the amide polyether group-containing polyorganosiloxane.

In addition, in the oxyalkylene group-containing polyorganosiloxane of the aforementioned component, the total amount of aldehydes and ketones which cause unpleasant odors is preferably 100 ppm or less and further preferably 50 ppm or less. If the amount exceeds 100 ppm, unpleasant odors may be imparted when wipe paper is treated with the composition of the present invention.

In the treatment composition for wipe paper of the present invention, a surfactant can be further blended. The oxyalkylene group-containing polyorganosiloxane and the aforementioned surfactant used in the composition of the present invention can be components for stably emulsifying the amide polyether group-containing polyorganosiloxane. For this reason, the treatment composition for wipe paper of the present invention in this case may preferably be in the form of an emulsion. In the form of an emulsion, a phase containing the amide polyether group-containing polyorganosiloxane may constitute a dispersion phase or alternatively a continuous phase, but preferably constitutes the dispersion phase.

As the surfactant, a cationic surfactant, a nonionic surfactant other than the oxyalkylene group-containing polyorganosiloxane, an anionic surfactant, and an amphoteric surfactant can be used. One type of the aforementioned surfactants may be used alone, or two or more types thereof may be used in combination. Among these, the cationic surfactant can impart smoothness and softness to wipe paper, exhibits good storage stability of the emulsion and good blending stability with respect to the polyhydric alcohol described below, and therefore, the cationic surfactant is preferred.

The cationic surfactants are not particularly limited. As examples thereof, mention may be made of, for example, quaternary ammonium salt types of surfactants represented by alkyltrimethylammonium salts such as octadecyltrimethylammonium chloride, hexadecyltrimethylammonium chloride, and the like; and dialkyldimethylammonium salts such as dioctadecyldimethylammonium chloride, dihexadecyldimethylammonium chloride, didecyldimethylammonium chloride, and the like.

The nonionic surfactants are not particularly limited. As examples thereof, mention may be made of, for example, glycerol fatty acid esters, sorbitan fatty acid esters, polyoxyalkylene alkyl ethers, polyoxyalkylene alkyl phenyl ethers, polyoxyalkylene sorbitan fatty acid esters, polyoxyalkylene glycerol fatty acid esters, polyoxyethylene-polyoxypropylene copolymer types of nonionic emulsifiers and the like. Here, as examples of alkyl groups, mention may be made of, for example, medium or higher alkyl groups such as a decyl group, an undecyl group, a dodecyl group, a tridecyl group, a tetradecyl group, a cetyl group, a stearyl group and the like. In addition, as examples of fatty acids, mention may be made of higher or medium fatty acids such as lauric acid, palmitic acid, stearic acid, oleic acid and the like.

The anionic surfactant is not particularly limited. As examples thereof, mention may be made of, for example, alkylbenzenesulfonates, alkyl ether sulfates, polyoxyethylene alkyl ether sulfates, polyoxyethylene alkyl phenyl ether sulfates, alkyl naphthyl sulfonates, unsaturated aliphatic sulfonates, hydroxylated aliphatic sulfonates, and the like. Here, as examples of alkyl groups, mention may be made of, for example, medium or higher alkyl groups such as a decyl group, an undecyl group, a dodecyl group, a tridecyl group, a tetradecyl group, a cetyl group, a stearyl group and the like. In addition, as examples of unsaturated aliphatic groups, mention may be made of an oleyl group, a nonenyl group, an octynyl group and the like. In addition, as examples of couterions, mention may be made of sodium, potassium, lithium or ammonium ion, or the like. Among these, sodium is general.

The amphoteric surfactants are not particularly limited. As examples thereof, mention may be made of N,N-dialkylaminoalkylene carboxylates, and alkyl betaines such as N,N-dimethyl-N-alkyl-N-carboxymethyl ammonium betaine, N,N,N-trialkyl-N-sulfoalkylene ammonium betaine, N,N-dialkyl-N,N-bispolyoxyethylene ammonium sulfate betaine and the like, as well as, alkylimidazolines such as 2-alkyl-N-carboxymethyl-N-hydroxyethylimidazolinium betaine and the like.

The blending amount of the surfactant preferably ranges from 5 to 2,000 parts by weight, more preferably ranges from 10 to 1,000 parts by weight, and further preferably ranges from 15 to 500 parts by weight, with respect to 100 parts by weight of the amide polyether group-containing polyorganosiloxane.

In the treatment composition for wipe paper of the present invention, a polyhydric alcohol may also be blended. The polyhydric alcohol has a function as a humectant, imparts a moisturizing sensation to wipe paper such as tissue paper, toilet paper or the like, and possesses an effect for further improving smoothness and softness thereof. The polyhydric alcohol is a compound having two or more hydroxyl groups in the molecule. As examples thereof, mention may be made of ethylene glycol, polyethylene glycol, diethylene glycol, triethylene glycol, propylene glycol, glycerol, diglycerol, polyglycerol, pentaerytritol, sorbitol, mannitol, glucose, sucrose, fructose, and gluconic acid represented by the following formula:

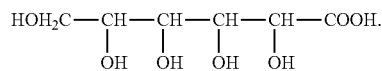

Among these, glycerol, diglycerol, polyglycerol, and sorbitol are, in particular, useful. The blending amount of this component preferably ranges from 50 to 20,000 parts by weight, and more preferably ranges from 100 to 15,000 parts by weight, with respect to 100 parts by weight of the amide polyether group-containing polyorganosiloxane. If the amount is below 50 parts by weight, the effects as a humectant may be insufficient. On the other hand, if the amount exceeds 20,000 parts by weight, insufficient softness or smoothness may be exhibited.

In the treatment composition for wipe paper of the present invention, water can also be blended. Water used in the present invention preferably contains no components inhibiting storage stability of an emulsified product. As examples thereof, mention may be made of ion-exchanged water, distilled water, well water, and tap water. The amount of water may be an amount to sufficiently maintain a stable aqueous emulsion state. The blending amount thereof is not particularly limited.

The treatment composition for wipe paper of the present invention can be produced, for example, by diluting the amide polyether group-containing polyorganosiloxane in a solvent such as ethanol to form a solution. In addition, after the amide polyether group-containing polyorganosiloxane and the surfactant are uniformly mixed, for example, water is added thereto and stirred, and thereby, an oil-in-water or water-in-oil emulsion, and preferably an oil-in-water emulsion can be produced. When an emulsion is produced, for example, a propeller type stirrer such as a stirrer with two blades, four blades or six blades, a homogenizer, a colloid mill, a sonolater, a line mixer, a homomixer, and the like can be appropriately used.

In the treatment composition for wipe paper of the present invention, in the case of storing for a long time under acidic conditions of pH 5.5 or less, the production of aldehydes and ketones causing unpleasant odors may be accelerated. On the other hand, in the case of a weak acidic condition to an alkaline condition of pH 6 to 10, an occurrence of unpleasant odors can be controlled. For this reason, in order to control odors, it can be important to adjust the pH. Thus, the pH of the composition according to the present invention preferably ranges from 6 to 10, and more preferably ranges from 7 to 9.

In the treatment composition for wipe paper of the present invention, fragrances, colorants, preservatives, antiseptics, antifungal agents and the like can also be blended.

The treatment composition for wipe paper of the present invention can be preferably used in treating wipe paper represented by tissue paper or toilet paper. As examples of methods for treating wipe paper with the composition according to the present invention, mention may be made of a method of adding the composition to pulp in the papermaking step; a method of adhering the composition by coating one surface or both surfaces of the wipe paper by means of a gravure roll or a kiss roll; and a method of adhering the composition to the wipe paper by spraying with a spray apparatus before, during or after a drying step. The adhering amount of the composition according to the present invention varies depending on the purpose or usage of wipe paper. The adhering amount of the polyorganosiloxanes with respect to wipe paper preferably ranges from 0.1 to 20.0% by weight, and more preferably ranges from 0.5 to 10.0% by weight.

In accordance with the treatment composition for wipe paper of the present invention, only by applying the composition to wipe paper such as tissue paper, toilet paper or the like and subsequently evaporating the diluent such as an organic solvent, water or the like, advantages, in which water absorbability of wipe paper such as tissue paper, toilet paper or the like is maintained, and at the same time, superior smoothness and softness are imparted and yellowing of the wipe paper does not occur, can be provided. Accordingly, the wipe paper according to the present invention, which has been treated with the treatment composition according to the present invention, has superior smoothness and softness, in addition to superior water absorbability, and the color of the wipe paper does not change to yellow.

In addition, in the case of the treatment composition for wipe paper of the present invention in the form of an emulsion, the particle size of the dispersion phase containing the amide polyether group-containing polyorganosiloxane is small, and for this reason, superior stability of an emulsified product and superior storage stability can be exhibited.

EXAMPLES

Hereafter, the present invention is described in detail with reference to Examples and Comparative Examples. It should be understood that the present invention is not limited thereto. Hereafter, "parts" means parts by weight, and the viscosity is a value measured at 25° C. The particle size of the emulsion was obtained by measuring in accordance with a dynamic light scattering method using a submicron particle analyzer (COULTER MODEL N4 MD, manufactured by Coulter Electronics), and calculating based on monodispersity mode analysis.

Evaluation of wipe paper was carried out in accordance with the test methods described below.

(Smoothness and Softness)

Smoothness and softness were evaluated by folding 5 sets of double sheets of tissue paper treated with the composition for treating wipe paper, and contacting the paper with fingers. The evaluation criteria are described below.

OO: Superior
O: Slightly good
Δ: Slightly poor
X: Very poor

Commercially available tissue paper was purchased, and after the tissue paper was subjected to extraction with a mixed solvent of toluene and ethanol (mixing ratio of toluene and ethanol=1:1), it was confirmed that no treatment agent was adhered. The tissue paper without any treatment agent was used.

(Water Absorbability)

Water in an amount of 20 μL was dripped by means of a syringe on the surface of the tissue paper treated by the composition for treating wipe paper. The period (in seconds) until the aforementioned aqueous droplet was absorbed and dispersed in tissue paper was measured. Measurements at 3 points were carried out, and evaluation was carried out by the average value thereof. The evaluation criteria are described below.

OO: 3 seconds or less
O: 3 to 10 seconds
Δ: 10 to 60 seconds
X: 60 seconds or more (Yellowing)

Four sets of double sheets of tissue paper treated with the composition for treating wipe paper were doubly folded, and the degree of yellowing was measured by measuring b* with a colorimeter (Color-guide 45°/0°, manufactured by BYK-Gardner). Measurements at 5 points were carried out and evaluation was carried out using the average value thereof. The evaluation criteria are described below.

OO: b* was less than blank.
X: b* was blank or more.

Reference Example 1

An organopolysiloxane containing amino and polyether groups (viscosity=1,000 mPa·s) and a polyoxyethylene (4.5) lauryl ether acetic acid were placed in a four-necked flask equipped with a stirrer, a thermometer, a tube for introducing a nitrogen gas, and a Dean-Stark apparatus. The mixture was reacted for 2 hours at 130° C. The obtained reaction mixture was an amide polyether group-containing polyorganosiloxane (viscosity=1,000 mPa·s) represented by the following formula:

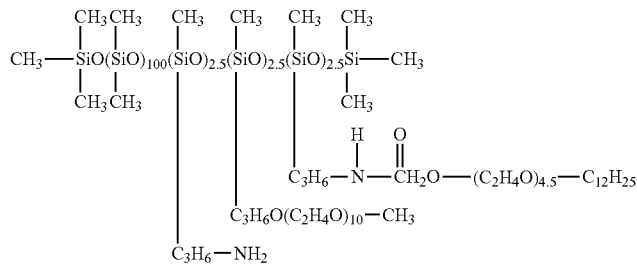

Example 1

In a beaker with a volume of 50 mL, 0.5 g of the amide polyether group-containing polyorganosiloxane (viscosity=1,000 mPa·s) represented by the following formula:

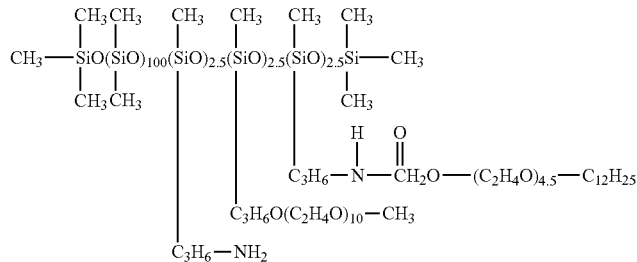

and 49.5 g of ethanol were placed and mixed. Thereby, a solution of a treatment composition was produced. The aforementioned solution of the treatment composition was transported in a square tray, and 5 sets of double sheets of tissue paper with 200 mm×205 mm were immersed therein. After the immersion for 10 seconds, the tissue paper was squeezed by means of a squeezing roller, and subsequently dried at room temperature. The adhering amount of the treatment composition with respect to the obtained tissue paper was 0.9% by weight. Smoothness, softness, water absorbability and yellowing thereof were evaluated. The results are shown in Table 1.

Example 2

10 parts by weight of the amide polyether group-containing polyorganosiloxane used in Example 1 and 20 parts by weight of an oxyethylene group-containing organopolysiloxane having a viscosity of 300 mPa·s, represented by the following formula:

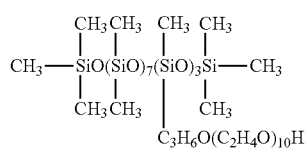

were stirred for 5 minutes at high speed by means of a stirrer with 4 blades. 10 parts by weight of water was added thereto, and the mixture was stirred for 30 minutes at high speed. In addition, 60 parts by weight of water was further added thereto, and the mixture was stirred for 15 minutes at high speeds. An appropriate amount of an aqueous solution of sodium carbonate was added thereto, and thereby, the pH was adjusted to 8. Thereby, a silicone emulsion composition for treating wipe paper was prepared. The particle size of the emulsion was 58 nm. In a beaker with a volume of 50 mL, 1.7 g of the aforementioned emulsion composition and 48.3 g of ethanol were placed, and they were mixed. Thereby, a solution of the treatment composition was prepared. Subsequently, the treatment was carried out on the tissue paper in the same manner as described in Example 1. The adhering amount of the treatment composition with respect to the obtained tissue paper was 0.9% by weight. Smoothness, softness, water absorbability and yellowing thereof were evaluated. The results are shown in Table 1.

Example 3

10 parts by weight of the amide polyether group-containing polyorganosiloxane used in Example 1 and 20 parts by weight of the oxyethylene group-containing polyorganosiloxane used in Example 2, as well as 3 parts by weight of a 30% aqueous solution of hexadecyltrimethylammonium chloride which was a cationic surfactant were stirred for 5 minutes at high speed using a stirrer with 4 blades. 10 parts by weight of water was added thereto, and the mixture was stirred for 30 minutes at high speed. In addition, 57 parts by weight of water was added thereto, and the mixture was stirred for 15 minutes at high speed. An appropriate amount of an aqueous solution of sodium carbonate was added thereto, and thereby, the pH was adjusted to 8. Thereby, a silicone emulsion composition for use in treating wipe paper was prepared. The particle size of the emulsion was 21 nm. In a beaker with a volume of 50 mL, 1.7 g of the aforementioned emulsion composition and 48.3 g of ethanol were placed. They were mixed and thereby, a solution of a treatment composition was prepared. Subsequently, the treatment was carried out on the tissue paper in the same manner as described in Example 1. The adhering amount of the treatment composition with respect to the obtained tissue paper was 0.9% by weight. Smoothness, softness, water absorbability and yellowing thereof were evaluated. The results are shown in Table 1.

Example 4

10 parts by weight of the amide polyether group-containing polyorganosiloxane used in Example 1 and 20 parts by weight of the oxyethylene group-containing polyorganosiloxane used in Example 2 were stirred for 5 minutes at high speed using a stirrer with 4 blades. 10 parts by weight of water was added thereto, and the mixture was stirred for 30 minutes at high speed. In addition, 55 parts by weight of water was further added thereto, and the mixture was stirred for 15 minutes at high speed. 5 parts by weight of polyoxyethylene (10 mol) isocetyl ether was added thereto, and the mixture was stirred for 15 minutes at high speed. Subsequently, an appropriate amount of an aqueous solution of sodium carbonate was added thereto, and thereby, the pH was adjusted to 8. Thereby, a silicone emulsion composition for use in treating wipe paper was prepared. The particle size of the emulsion was 16 nm. In a beaker with a volume of 50 mL, 1.7 g of the aforementioned emulsion composition and 48.3 g of ethanol were placed. They were mixed and thereby, a solution of a treatment composition was prepared. Subsequently, the treatment was carried out on the tissue paper in the same manner as described in Example 1. The adhering amount of the treatment composition with respect to the obtained tissue paper was 1.1% by weight. Smoothness, softness, water absorbability and yellowing thereof were evaluated. The results are shown in Table 1.

Example 5

A silicone emulsion composition for use in treating wipe paper was obtained in the same manner as described in Example 2, with the exception of changing the blending amount of the oxyethylene group-containing polyorganosiloxane used in Example 2 from 20 parts to 30 parts, and reducing the blending amount of water to compensate therefor. The particle size of the emulsion was 79 nm. In a beaker with a volume of 50 mL, 1.7 g of the aforementioned emulsion composition and 48.3 g of ethanol were placed. They were mixed and thereby, a solution of a treatment composition was prepared. Subsequently, the treatment was carried out on the tissue paper in the same manner as described in Example 1. The adhering amount of the treatment composition with respect to the obtained tissue paper was 1.3% by weight. Smoothness, softness, water absorbability and yellowing thereof were evaluated. The results are shown in Table 1.

Example 6

In a beaker with a volume of 50 mL, 1.7 g of the silicone emulsion composition for treating wipe paper prepared in Example 2, 2 g of glycerol, and 46.3 g of ethanol were placed and mixed. Thereby, a solution of a treatment composition was prepared. Subsequently, the treatment was carried out on the tissue paper in the same manner as described in Example 1. The adhering amount of the treatment composition with respect to the obtained tissue paper was 4.5% by weight. Smoothness, softness, water absorbability and yellowing thereof were evaluated. The results are shown in Table 1.

Example 7

A silicone emulsion composition for treating wipe paper was obtained in the same manner as described in Example 3, with the exception of replacing 3 parts of a 30% aqueous solution of hexadecyl trimethylammonium chloride which was the cationic surfactant used in Example 3 with 6.5 parts, and reducing the blending amount of water to compensate therefor. The particle size of the emulsion was 24 nm. In a beaker with a volume of 50 mL, 1.7 g of the aforementioned silicone emulsion composition for treating wipe paper and 48.3 g of glycerol were placed and mixed. Thereby, a solution of a treatment composition was prepared. The aforementioned solution of the treatment composition was uniformly applied on a squeezing roller. Subsequently, one set of double sheets of tissue paper of 200 mm×205 mm was treated. The adhering amount of the treatment composition with respect to the obtained tissue paper as described above was 6.5% by weight. Smoothness, softness, water absorbability and yellowing thereof were evaluated. The results are shown in Table 1.

Comparative Example 1

Smoothness, softness, water absorbability and yellowing of commercially available tissue paper on which none of the treatments used in Examples 1 to 7 were applied were evaluated. The results are shown in Table 1.

Comparative Example 2

In a beaker with a volume of 50 mL, 0.5 g of the oxyethylene group-containing polyorganosiloxane used in Example 2 and 49.5 g of ethanol were placed, and they were mixed. Thereby, a solution of a treatment composition was prepared. Subsequently, the treatment was carried out on the tissue paper in the same manner as described in Example 1. The adhering amount of the treatment composition with respect to the obtained tissue paper was 0.9% by weight. Smoothness, softness, water absorbability and yellowing thereof were evaluated. The results are shown in Table 1.

Comparative Example 3

In a beaker with a volume of 50 mL, 0.5 g of an amino group-containing polydiorganosiloxane with a viscosity of 1,100 mPas, represented by the following formula:

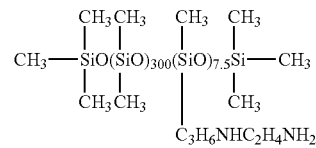

and 49.5 g of ethanol were placed, and they were mixed. Thereby, a solution of a treatment composition was prepared. Subsequently, the treatment was carried out on the tissue paper in the same manner as described in Example 1. The adhering amount of the treatment composition with respect to the obtained tissue paper was 0.9% by weight. Smoothness, softness, water absorbability and yellowing thereof were evaluated. The results are shown in Table 1.

Comparative Example 4

10 parts by weight of the amino group-containing polydiorganosiloxane used in Comparative Example 3 and 20 parts by weight of the oxyethylene group-containing polyorganosiloxane used in Example 2 were stirred for 5 minutes at high speed using a stirrer with 4 blades. 10 parts by weight of water was added thereto, and the mixture was stirred for 30 minutes at high speed. In addition, 60 parts by weight of water was further added thereto, and the mixture was stirred for 15 minutes at high speed. An appropriate amount of an aqueous solution of sodium carbonate was added thereto, and thereby, the pH was adjusted to 8. Thereby, a silicone emulsion composition for use in treating wipe paper was prepared. The particle size of the emulsion was 95 nm. In a beaker with a volume of 50 mL, 1.7 g of the aforementioned emulsion composition and 48.3 g of ethanol were placed and mixed. Thereby, a solution of a treatment composition was prepared. Subsequently, the treatment was carried out on the tissue paper in the same manner as described in Example 1. The adhering amount of the treatment composition with respect to the obtained tissue paper was 0.9% by weight. Smoothness, softness, water absorbability and yellowing thereof were evaluated. The results are shown in Table 1.

Comparative Example 5

In a beaker with a volume of 50 mL, 1.7 g of the silicone emulsion composition for treating wipe paper prepared in Comparative Example 4, 2 g of glycerol, and 46.3 g of ethanol were placed, and they were mixed. Thereby, a solution of a treatment composition was prepared. Subsequently, the treatment was carried out on the tissue paper in the same manner as described in Example 1. The adhering amount of the treatment composition with respect to the obtained tissue paper was 4.5% by weight. Smoothness, softness, water absorbability and yellowing thereof were evaluated. The results are shown in Table 1.

TABLE 1

| | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Smoothness | ⊚ | ○ | ○ | ○ | ○ | ⊚ | ○ | X | Δ | ⊚ | ○ | ⊚ |
| Softness | ○ | Δ | Δ | ○ | ○ | ⊚ | ⊚ | X | X | ⊚ | ○ | ⊚ |
| Water absorbability | ⊚ | ⊚ | ⊚ | ⊚ | ⊚ | ⊚ | ⊚ | ⊚ | ⊚ | X | X | X |
| Yellowing | ⊚ | ⊚ | ⊚ | ⊚ | ⊚ | ⊚ | ⊚ | ⊚ | ⊚ | X | X | X |

INDUSTRIAL APPLICABILITY

The present invention can be used as an agent for treating wipe paper such as tissue paper, toilet paper or the like. According to the present invention, it is possible to improve the texture such as softness and smoothness of the wipe paper, and prevent color change of the wipe paper, without impairing wiping properties and water absorbability of the wipe paper.

The invention claimed is:

1. A treatment composition for wipe paper comprising an amide polyether group-containing polyorganosiloxane represented by the following general formula:

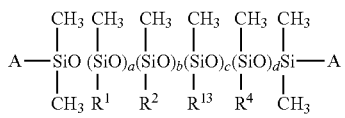

wherein
each A is independently an alkyl group having 1 to 22 carbon atoms or a hydroxyl group;
$R^1$ is an alkyl group having 1 to 22 carbon atoms;
$R^2$ is a group represented by the following formula:

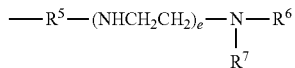

wherein $R^5$ is a divalent hydrocarbon group having 1 to 22 carbon atoms; each of $R^6$ and $R^7$ is independently a hydrogen atom or an organic group selected from the group consisting of a monovalent hydrocarbon group having 1 to 22 carbon atoms, an acyl group, and a group represented by the following formula:

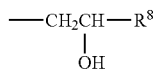

wherein $R^8$ is a monovalent hydrocarbon group having 1 to 22 carbon atoms; and e is an integer ranging from 0 to 5;
$R^3$ is a group represented by —$R^9$—O—$(C_2H_4O)_f$—$(C_lH_{2l}O)_g$—$R^{10}$ wherein $R^9$ is a divalent hydrocarbon group having 1 to 22 carbon atoms; $R^{10}$ is a hydrogen atom or a monovalent hydrocarbon group having 1 to 22 carbon atoms; both f and g range from 0 to 50, with the proviso that f and g are not 0 at the same time; and l is an integer of 3 or more; $R^4$ is a group represented by the following formula:

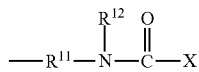

or a group represented by the following formula:

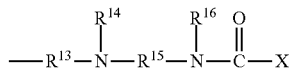

wherein each of $R^{11}$, $R^{13}$ and $R^{15}$ is independently a divalent hydrocarbon group having 1 to 22 carbon atoms; each of $R^{12}$, $R^{14}$ and $R^{16}$ is independently a hydrogen atom or a monovalent hydrocarbon group having 1 to 22 carbon atoms; X is a group represented by the following formula:

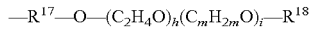

wherein $R^{17}$ is a divalent hydrocarbon group having 1 to 22 carbon atoms; $R^{18}$ is a hydrogen atom or a monovalent hydrocarbon group having 1 to 22 carbon atoms; both h and i range from 0 to 50, with the proviso that h and t are not 0 at the same time; and m is an integer of 3 or more; each of a and c independently ranges from 0 to 500; b is 1 or more; 1<d<500; and 10<a+b+c+d<1,000.

2. A treatment composition for wipe paper comprising
(A) the amide polyether group-containing polyorganosiloxane as recited in claim 1, and
(B) an oxyalkylene group-containing polyorganosiloxane which contains an organic group binding to a silicon atom, represented by the following formula:

$$-R^{19}-O-(C_2H_4O)_j(C_lH_{2n}O)_kR^{20}$$

wherein $R^{19}$ is a divalent hydrocarbon group having 1 to 22 carbon atoms; $R^{20}$ is a hydrogen atom or a monovalent hydrocarbon group having 1 to 22 carbon atoms; both j and k range from 0 to 50, with the proviso that j and k are not 0 at the same time; and n is an integer of 3 or more.

3. The treatment composition for wipe paper according to claim 2, wherein said component (A) and said component (B) are contained in a ratio of 5 to 2,000 parts by weight of said component (B) with respect to 100 parts by weight of said component (A).

4. The treatment composition for wipe paper according to claim 3, further comprising (D) a polyhydric alcohol.

5. The treatment composition for wipe paper according to claim 2, further comprising (D) a polyhydric alcohol.

6. The treatment composition for wipe paper according to claim 5, wherein said component (D) is contained in a ratio of 50 to 20,000 parts by weight with respect to 100 parts by weight of said component (A).

7. The treatment composition for wipe paper according to claim 6, wherein said component (D) is at least one selected from the group consisting of glycerol, diglycerol, polyglycerol and sorbitol.

8. The treatment composition for wipe paper according to claim 5, wherein said component (D) is at least one selected from the group consisting of glycerol, diglycerol, polyglycerol and sorbitol.

9. The treatment composition for wipe paper according to claim 2, further comprising (C) a surfactant.

10. The treatment composition for wipe paper according to claim 9, wherein said component (A) and said component (B) are contained in a ratio of 5 to 2,000 parts by weight of said component (B) with respect to 100 parts by weight of said component (A).

11. The treatment composition for wipe paper according to claim 2, wherein said component (A) and said component (B) are contained in a ratio of 5 to 2,000 parts by weight of said component (B) with respect to 100 parts by weight of said component (A).

12. The treatment composition for wipe paper according to claim 1, further comprising (C) a surfactant.

13. The treatment composition for wipe paper according to claim 12, further comprising (D) a polyhydric alcohol.

14. The treatment composition for wipe paper according to claim 1, further comprising (E) water.

15. The treatment composition for wipe paper according to claim 1, wherein the treatment composition is in the form of an emulsion.

16. Wipe paper characterized by being treated with the treatment composition for wipe paper as recited in claim 1.

* * * * *